US012618509B2

(12) United States Patent
Li

(10) Patent No.: US 12,618,509 B2
(45) Date of Patent: May 5, 2026

(54) TELESCOPIC SUPPORT FOOT AND SUPPORT FRAME

(71) Applicant: Fotopro (Guangdong) Image Industrial Co., Ltd., Zhongshan (CN)

(72) Inventor: Zhihua Li, Zhongshan (CN)

(73) Assignee: Fotopro (Guangdong) Image Industrial Co., Ltd., Zhongshan (CN)

( * ) Notice: Subject to any disclaimer, the term of this patent is extended or adjusted under 35 U.S.C. 154(b) by 199 days.

(21) Appl. No.: 18/241,251

(22) Filed: Sep. 1, 2023

(65) Prior Publication Data

US 2024/0200716 A1 Jun. 20, 2024

(30) Foreign Application Priority Data

Dec. 16, 2022 (CN) .......................... 202223420174.2

(51) Int. Cl.
F16M 11/32 (2006.01)

(52) U.S. Cl.
CPC ....... F16M 11/32 (2013.01); *F16M 2200/027* (2013.01)

(58) Field of Classification Search
CPC .... F16M 11/32; F16M 2200/02; F16M 11/26; F16M 11/245; F16M 11/242; F16B 7/1418; G03B 17/561
USPC .... 248/157, 163.1, 431, 432, 166, 168, 169, 248/170, 171
See application file for complete search history.

(56) References Cited

U.S. PATENT DOCUMENTS

| | | | | |
|---|---|---|---|---|
| 6,913,231 B2 * | 7/2005 | Speggiorin | ............ | F16M 11/32 |
| | | | | 403/109.5 |
| 9,417,508 B2 * | 8/2016 | Yang | ...................... | F16M 11/32 |
| 2002/0030146 A1 * | 3/2002 | Akaike | .................. | F16M 11/32 |
| | | | | 248/188.5 |
| 2009/0161211 A1 * | 6/2009 | Jianguo | .................. | F16M 11/22 |
| | | | | 359/399 |
| 2016/0186791 A1 * | 6/2016 | Lee | ........................ | F16M 13/02 |
| | | | | 248/188.5 |

* cited by examiner

*Primary Examiner* — Alfred J Wujciak

(57) ABSTRACT

Disclosed are a telescopic support foot and a support frame. The support foot includes telescopic assemblies in cascade. The telescopic assemblies each include a telescopic rod; a first limiting device connected to a first end of the telescopic rod; a second limiting device connected to a second end of the telescopic rod. The first limiting device on a next-section telescopic rod can abut against the second limiting device of the telescopic rod to limit separation of the next-section telescopic rod from the telescopic rod. A locking device arranged at the second end of the telescopic rod, connected to the second limiting device, and configured to lock or unlock the second limiting device. The second limiting device can be separated from the second end of the telescopic rod when the locking device is in an unlocked state, to enable the next-section telescopic rod to be separated from the telescopic rod.

12 Claims, 10 Drawing Sheets

TELESCOPIC SUPPORT FOOT AND SUPPORT FRAME

TECHNICAL FIELD

The present disclosure relates to the field of support frames, and in particular, to a telescopic support foot and a support frame.

BACKGROUND

As is known to all, with characteristics of being extended to support photographic equipment for photographing or being shortened to reduce the volume of the photographic equipment to facilitate transportation, the telescopic support feet are widely used as support rods for photographic equipment, such as a selfie stick and a tripod.

Existing support frames used in the field of photographic equipment each usually have a multi-section telescopic structure. However, due to an unreasonable design of a connecting structure between previous-next sections of support frames, the multi-section telescopic structure of the support frame can only be disassembled section by section from top to bottom, and cannot be disassembled from bottom to top. When a last-section telescopic rod needs to be disassembled due to failure, etc., the entire support foot needs to be disassembled before the last-section telescopic rod is taken out for maintenance, which causes great inconvenience. Therefore, a novel telescopic support foot and support frame are urgently needed to solve the above problems.

SUMMARY

The present disclosure aims to solve at least one of the technical problems existing in the prior art. Therefore, the present disclosure provides a telescopic support foot and a support frame.

The technical solution adopted in an embodiment of the present disclosure to solve the technical problems is as follows: A telescopic support foot includes a plurality of telescopic assemblies in cascade, where the telescopic assemblies each include:

a telescopic rod with a first end inserted into a second end of a previous-section telescopic rod, where a next-section telescopic rod is inserted into a second end of the telescopic rod;

a first limiting device connected to the first end of the telescopic rod;

a second limiting device connected to the second end of the telescopic rod, where the first limiting device on the next-section telescopic rod can abut against the second limiting device of the telescopic rod to limit separation of the next-section telescopic rod from the telescopic rod; and a locking device arranged at the second end of the telescopic rod, connected to the second limiting device, and configured to lock or unlock the second limiting device, where the second limiting device can separated from the second end of the telescopic rod when the locking device is in an unlocked state, to enable the next-section telescopic rod to be separated from the telescopic rod.

Further, the first limiting device includes a first limiting sheet and a second limiting sheet that are arranged on an outer side of the telescopic rod, a first limiting protruding portion is arranged on an inner side wall of the first limiting sheet, a second limiting protruding portion is arranged on an inner side wall of the second limiting sheet, two sides of the telescopic rod are provided with a first limiting groove and a second limiting groove respectively, the first limiting protruding portion is inserted in the first limiting groove, and the second limiting protruding portion is inserted in the second limiting groove.

Further, the second limiting device includes a third limiting sheet and a fourth limiting sheet that are arranged on an inner side of the telescopic rod, where a first clamping head and a third limiting protruding portion are arranged on the third limiting sheet, a second clamping head and a fourth limiting protruding portion are arranged on the fourth limiting sheet, one side of the second end of the telescopic rod is provided with a first through groove and a third limiting groove communicating with the first through groove, the other side of the second end of the telescopic rod is provided with a second through groove and a fourth limiting groove communicating with the second through groove, and the locking device may be connected to the first clamping head and the second clamping head when the third limiting protruding portion extends into the third limiting groove through the first through groove and the fourth limiting protruding portion extends into the fourth limiting groove through the second through groove, so as to limit separation of the next-section telescopic rod from the telescopic rod.

Further, an end face of the second end of the telescopic rod is provided with a fifth limiting groove, and the first clamping head and the second clamping head are movably arranged in the fifth limiting groove.

Further, the locking device includes:

a ferrule sleeved at the second end of the telescopic rod and provided with a sixth limiting groove;

a first connecting rod connected to two open ends of the ferrule;

a spring sleeved on the first connecting rod and abutting against the two open ends of the ferrule;

a second connecting rod connected to an end of the first connecting rod by means of a detachable structure, and a wrench rotatably connected to the second connecting rod, where the wrench has a locking position and an unlocking position, and the first clamping head and the second clamping head can extend into the sixth limiting groove when the wrench is at the locking position, or can be separated from the sixth limiting groove when the wrench is at the unlocking position.

Further, the detachable structure is a threaded connection structure.

Further, an anti-slip gasket is arranged between the wrench and the ferrule.

A support frame includes the support foot.

The present disclosure has the following beneficial effects: A telescopic support foot and a support frame are provided, where the support foot includes a plurality of telescopic assemblies in cascade. The telescopic assemblies each include a telescopic rod with a first end inserted into a second end of a previous-section telescopic rod, where a next-section telescopic rod is inserted into a second end of the telescopic rod; a first limiting device connected to a first end of the telescopic rod; a second limiting device connected to a second end of the telescopic rod, where the first limiting device on a next-section telescopic rod can abut against the second limiting device of the telescopic rod to limit separation of the next-section telescopic rod from the telescopic rod; and a locking device arranged at the second end of the telescopic rod, connected to the second limiting device, and configured to lock or unlock the second limiting device, where the second limiting device can be separated from the second end of the telescopic rod when the locking device is in an unlocked state, to enable the next-section telescopic rod to be separated from the telescopic rod. With the above structure, the support foot can be separated from top to bottom or from bottom to top. In addition, the telescopic rod of each section can be detached independently, thereby greatly improving use flexibility of the support foot and facilitating maintenance.

BRIEF DESCRIPTION OF THE DRAWINGS

The above and/or additional aspects and advantages of the present disclosure will become apparent and readily comprehensible from the description of an embodiment with reference to the following accompanying drawings.

DETAILED DESCRIPTION OF THE EMBODIMENTS

A specific embodiment of the present disclosure will be described in detail below. A preferred embodiment of the present disclosure is illustrated in the accompanying drawings. The accompanying drawings serve to supplement the text description herein with figures, providing a visual understanding of each technical feature and the overall technical solution of the present disclosure, but cannot be construed as a limitation to the protection scope of the present disclosure.

In the description of the present disclosure, "a plurality of" means two or more; and the terms such as "greater than", "less than", and "more than" are construed as exclusive of the numerical value stated, and the terms such as "above", "below", and "within" are construed as inclusive of the numerical value stated. The "first" and "second" in the description are merely intended to distinguish between technical features, rather than to indicate or imply relative importance or implicitly indicate a number of the indicated technical features or implicitly indicate a sequence relationship of the indicated technical features.

In the description of the present disclosure, it should be understood that orientation or position relationships indicated by terms "upper", "lower", "front", "rear", "left", "right", etc. are orientation or position relationships shown in the accompanying drawings, and these terms are just used to facilitate description of the present disclosure and simplify the description, but not to indicate or imply that the mentioned device or element must have a specific orientation and must be constructed and operated in a specific orientation, and thus cannot be construed as a limitation to the present disclosure.

In the present disclosure, unless otherwise explicitly specified, the terms such as "arrange", "mount" and "connect" should be broadly understood. For example, they may be a direct connection, or an indirect connection by means of an intermediate medium; may be a fixed connection, a detachable connection or integral molding; may be a mechanical connection; or may be internal communication between two elements or an interactive relationship between two elements. Those skilled in the art may reasonably determine the specific meanings of the above terms in the present disclosure according to the specific contents of the technical solution.

Figure 1:
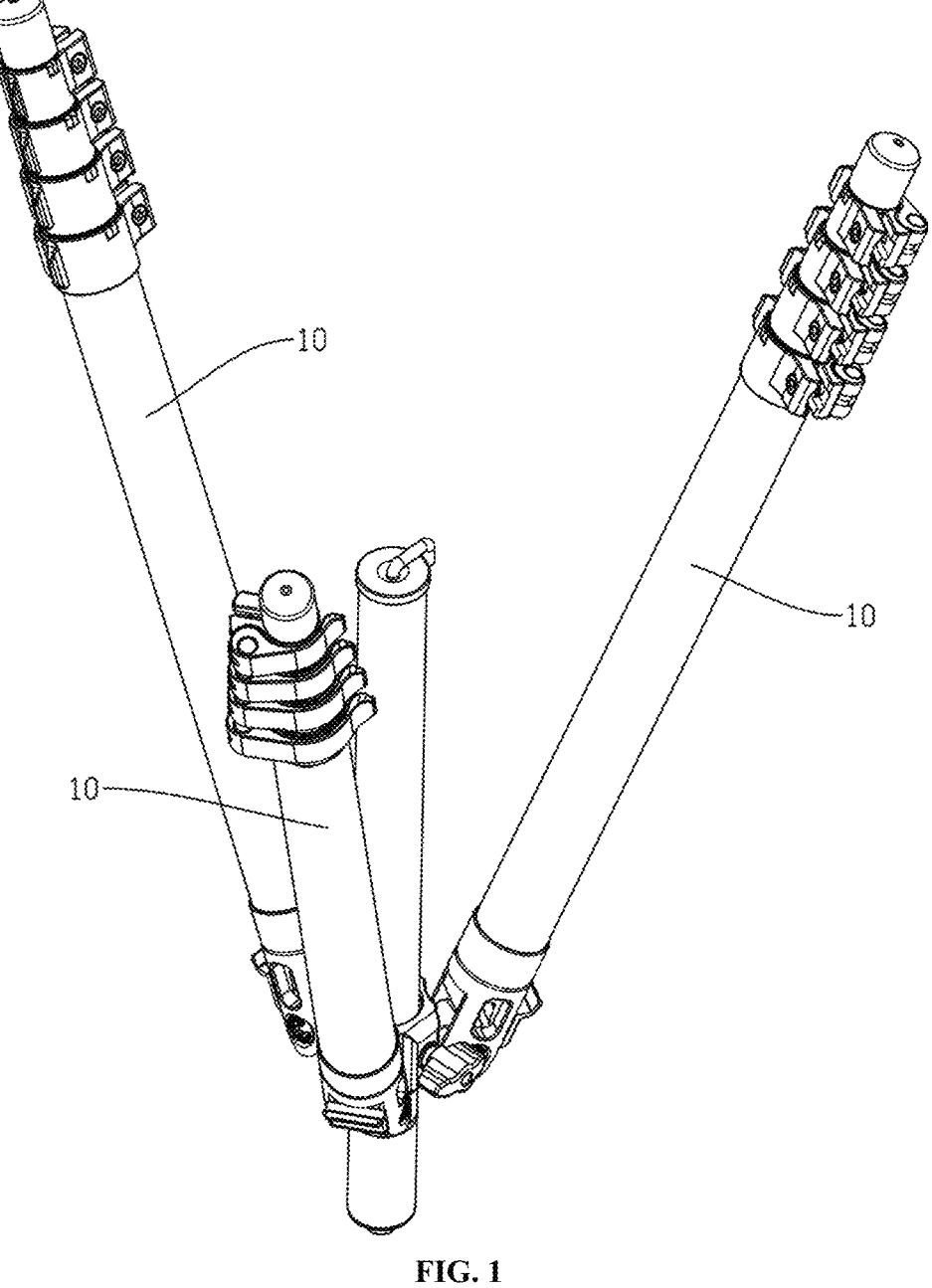
FIG. 1 is a schematic structural diagram of a support frame in a retracted state.
Figure 2:
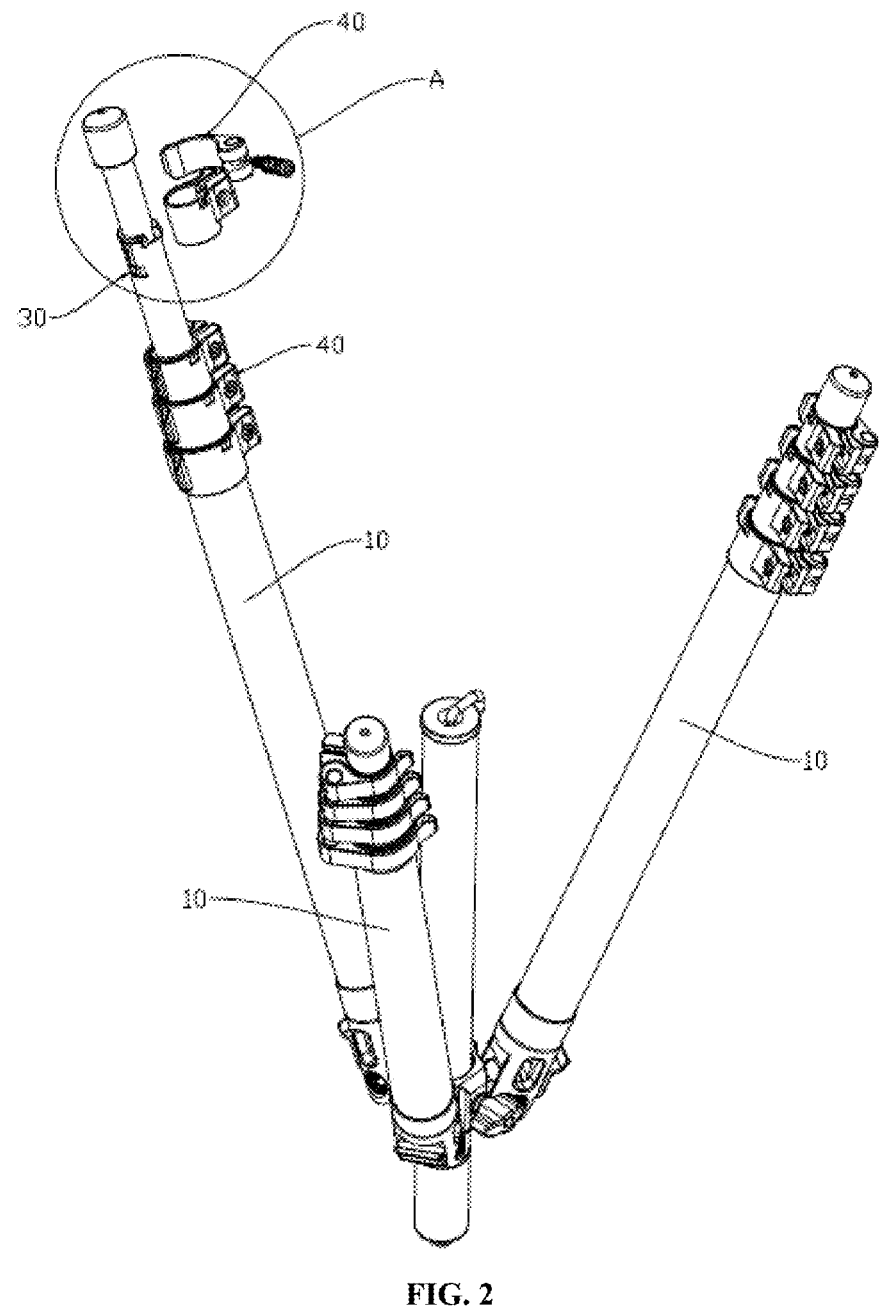
FIG. 2 is a first exploded view of a support frame in an extended state.
Figure 3:
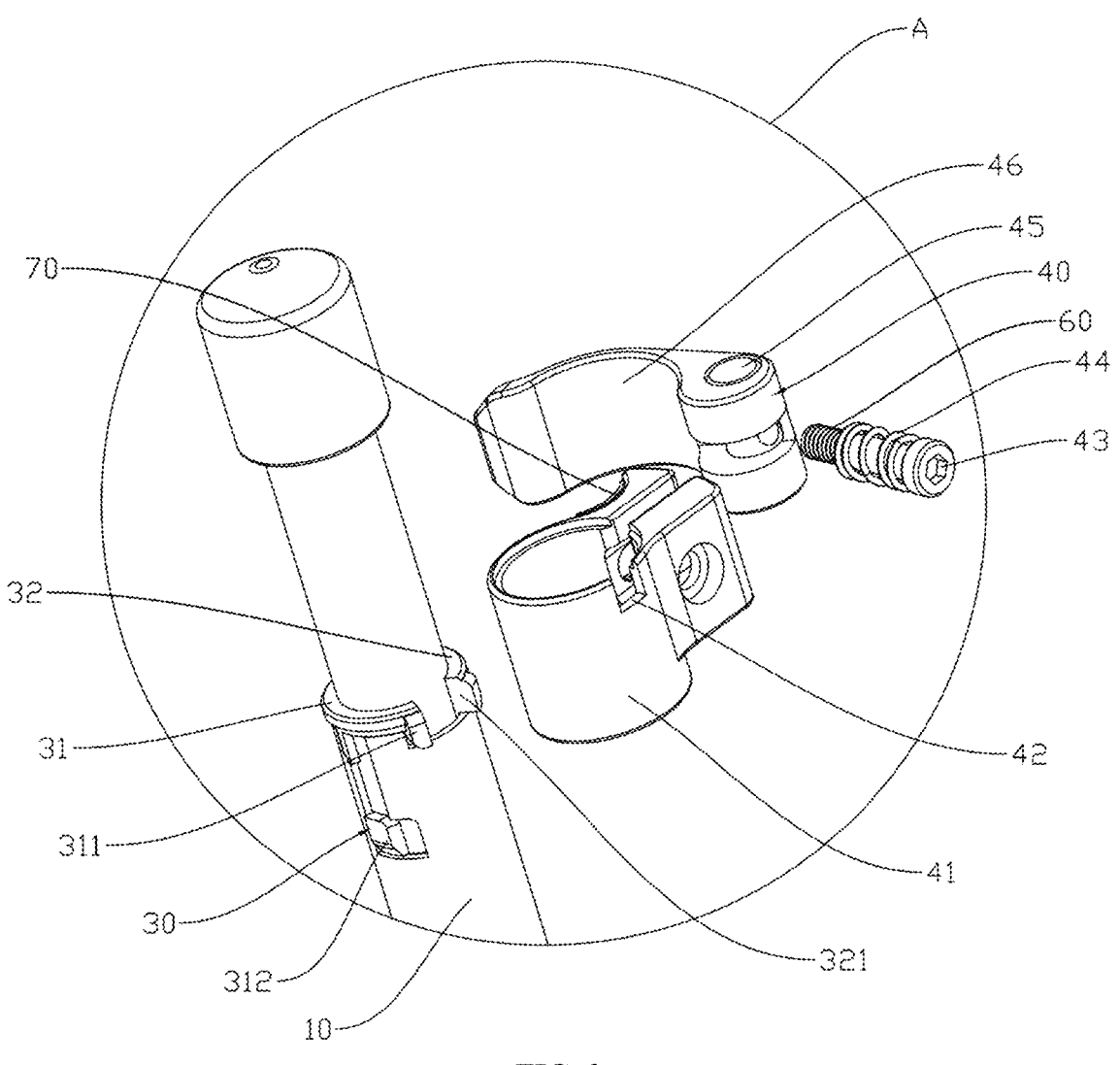
FIG. 3 is a partial enlarged view of an area A in FIG. 2.
Figure 4:
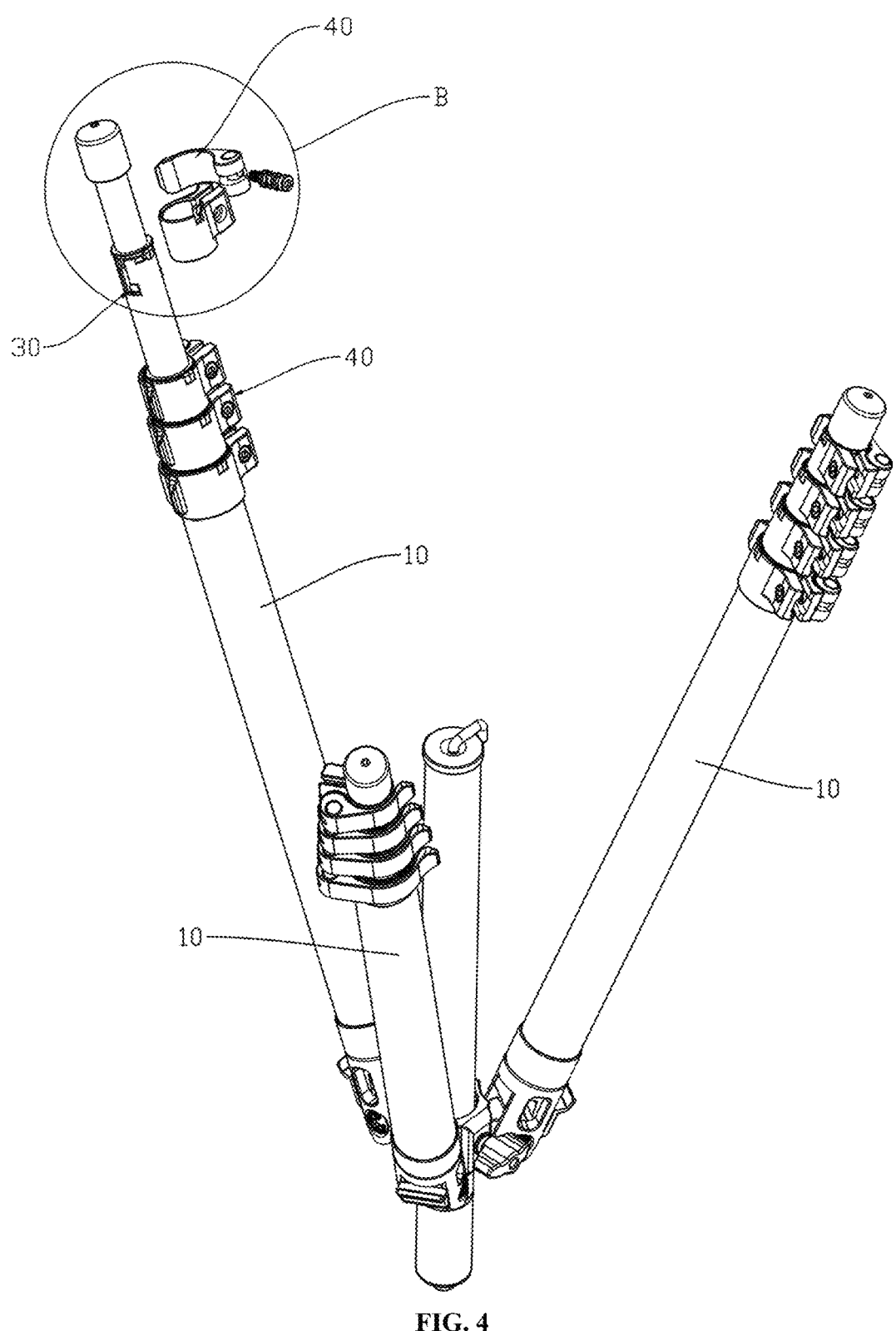
FIG. 4 is a second exploded view of a support frame in an extended state.
Figure 5:
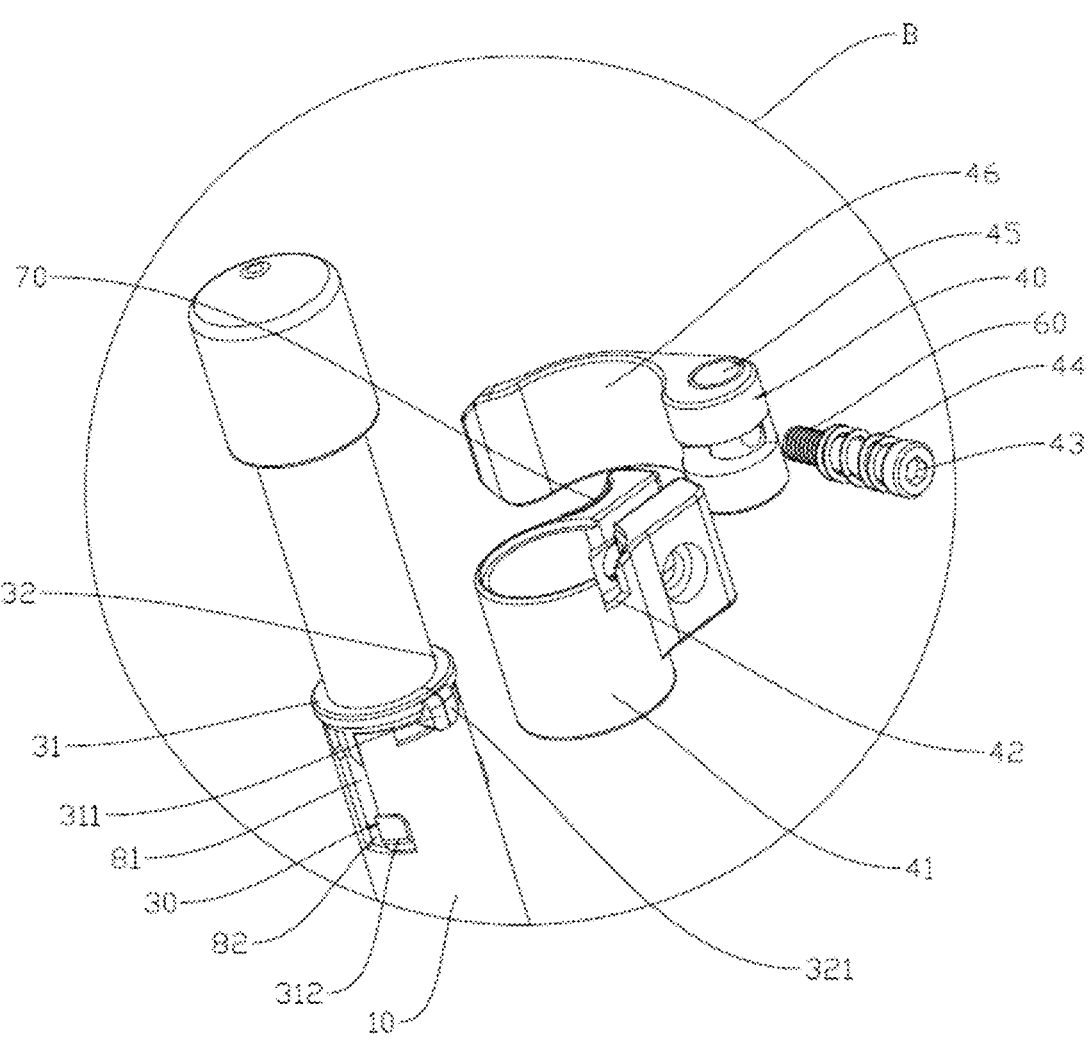
FIG. 5 is a partial enlarged view of an area B in FIG. 4.
Figure 6:
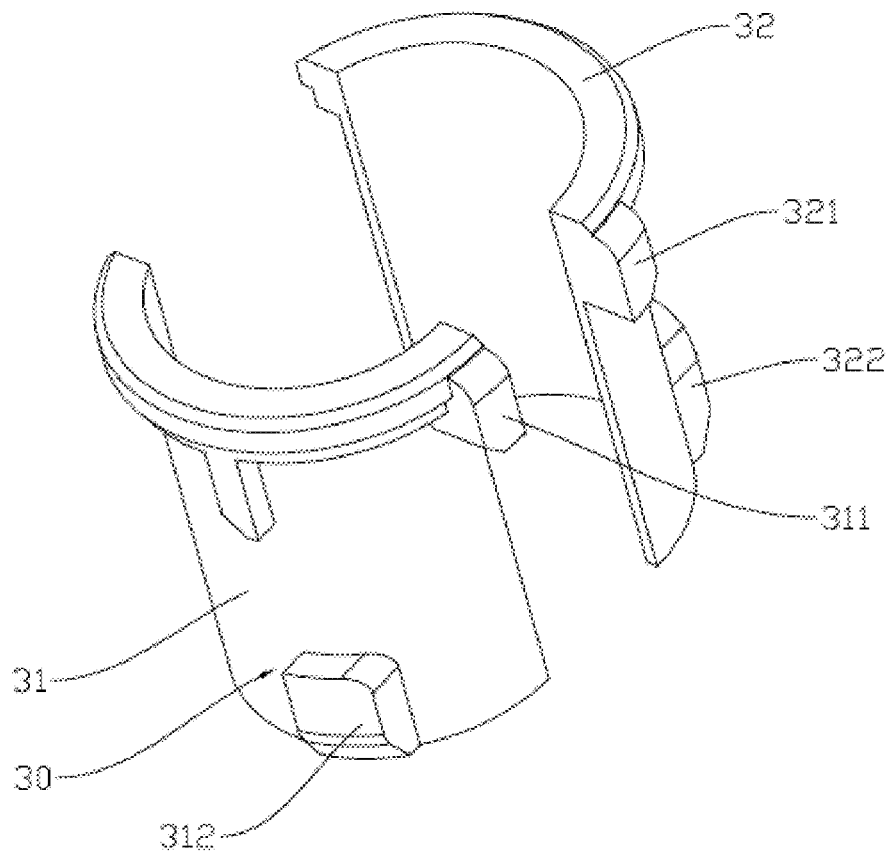
FIG. 6 is a schematic structural diagram of a third limiting sheet and a fourth limiting sheet.
Figure 7:
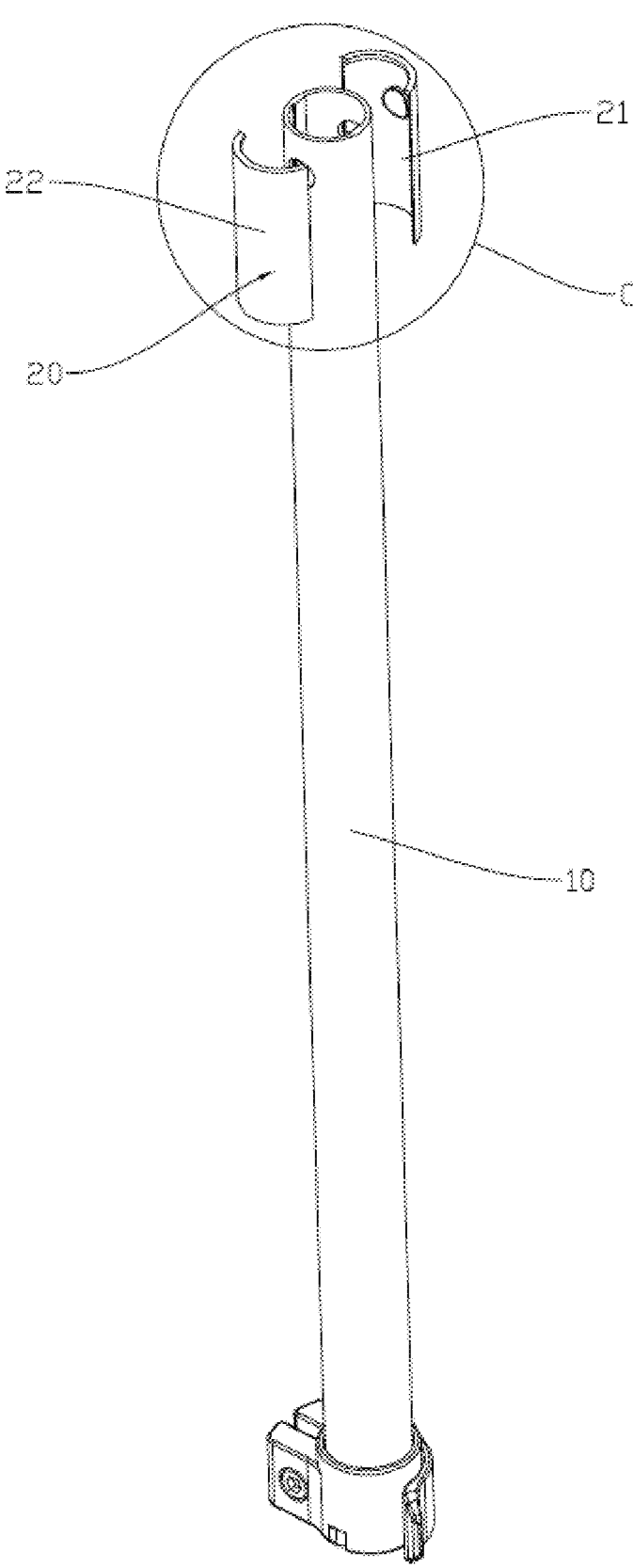
FIG. 7 is an exploded view of a partial structure of a support frame.
Figure 8:
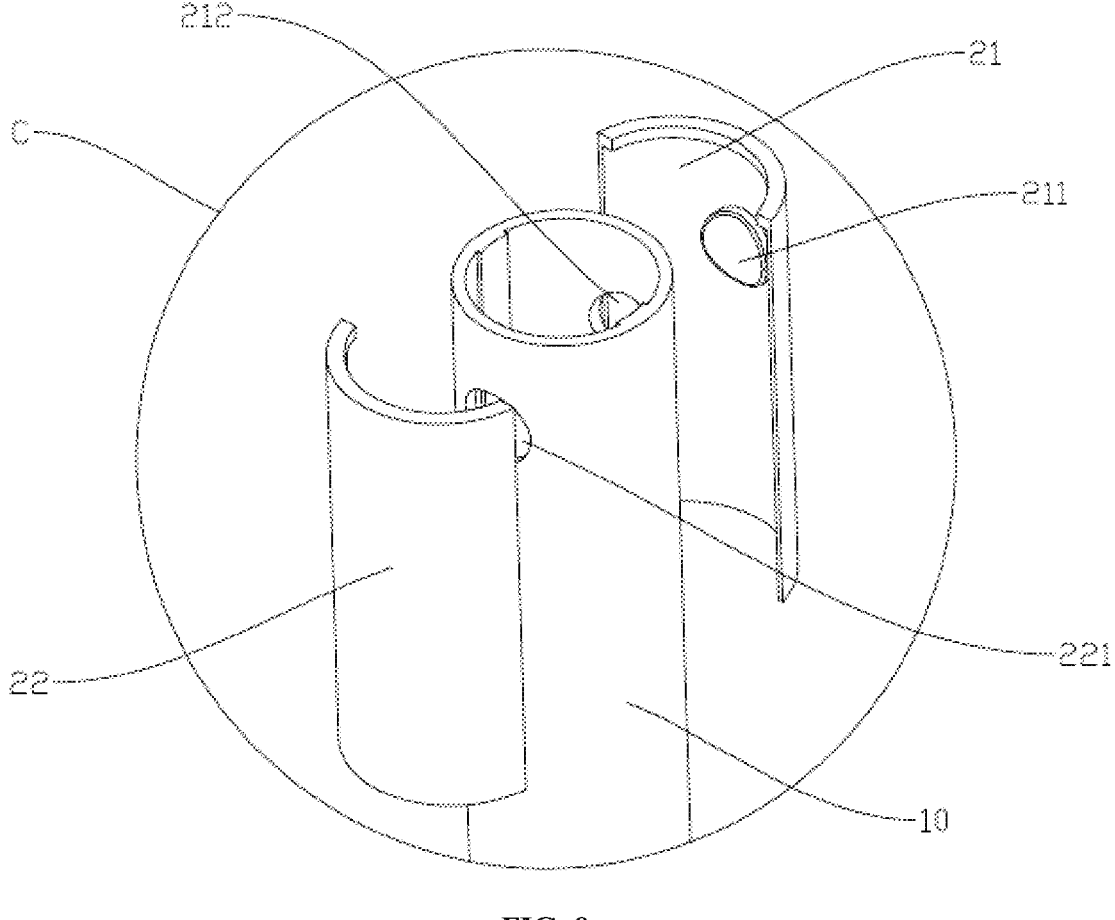
FIG. 8 is a partial enlarged view of an area C in FIG. 7.
Figure 9:
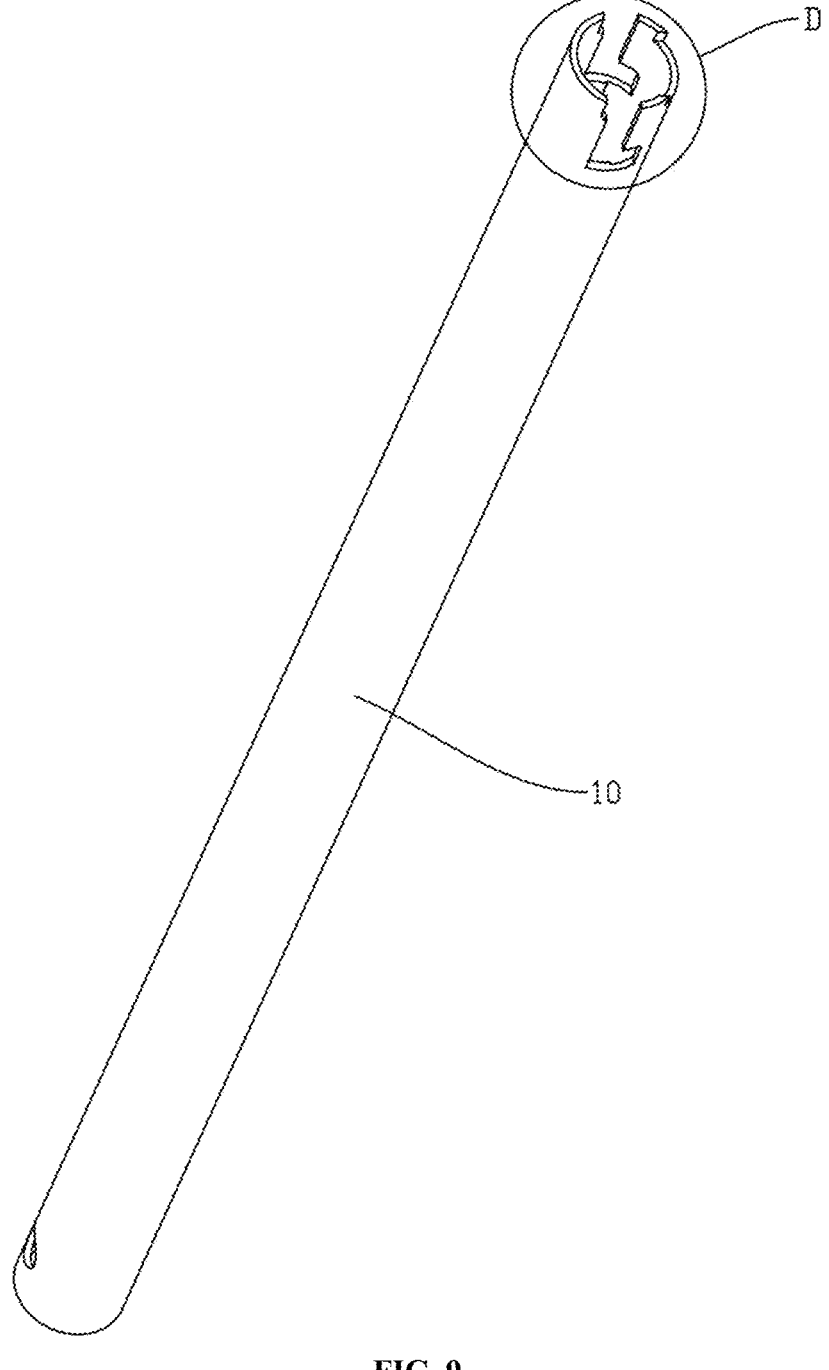
FIG. 9 is a schematic structural diagram of a telescopic rod.
Figure 10:
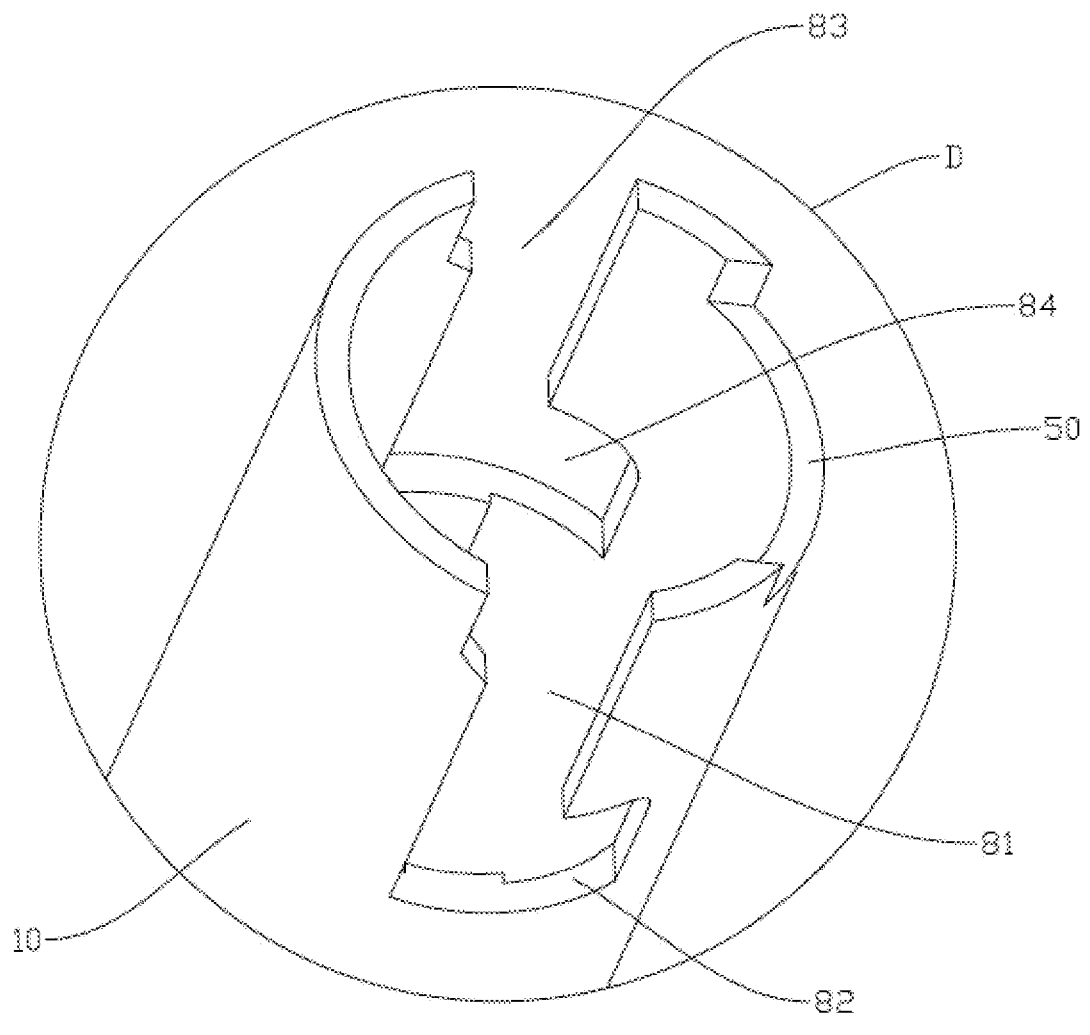
FIG. 10 is a partial enlarged view of an area D in FIG. 9.

Referring to FIGS. 1 to 10, a telescopic support foot includes a plurality of telescopic assemblies in cascade, where the telescopic assemblies each include:

a telescopic rod 10 with a first end inserted into a second end of a previous-section telescopic rod 10, where a next-section telescopic rod 10 is inserted into a second end of the telescopic rod 10;

a first limiting device 20 connected to the first end of the telescopic rod 10;

a second limiting device 30 connected to the second end of the telescopic rod 10, where the first limiting device 20 on the next-section telescopic rod 10 abuts against the second limiting device 30 of the telescopic rod 10 to limit separation of the next-section telescopic rod 10 from the telescopic rod 10; and a locking device 40 arranged at the second end of the telescopic rod 10, connected to the second limiting device 30, and configured to lock or unlock the second limiting device 30, where the second limiting device 30 can be separated from the second end of the telescopic rod 10 when the locking device 40 is in an unlocked state, to enable the next-section telescopic rod 10 to be separated from the telescopic rod 10.

In the present disclosure, a support foot with three sections of telescopic assemblies is taken as an example for description. For ease of description, the three sections of telescopic assemblies are a first telescopic assembly, a second telescopic assembly, and a third telescopic assembly. During assembly, a first limiting sheet 21 and a second limiting sheet 22 are mounted at the first end of the telescopic rod 10 of the second telescopic assembly, then the first end of the telescopic rod 10 of the second telescopic assembly is inserted into the telescopic rod 10 of the third telescopic assembly from the second end of the telescopic rod 10 of the third telescopic assembly, then a third limiting sheet 31 and a fourth limiting sheet 32 are inserted into the second end of the telescopic rod 10 of the second telescopic assembly, and the first end of the telescopic rod 10 of the first telescopic assembly is inserted into the telescopic rod 10 of the second telescopic assembly from the second end of the telescopic rod 10 of the second telescopic assembly. Further, a first through groove 81 and a third limiting groove 82 form a first L-shaped groove, a second through groove 83 and a fourth limiting groove 84 form a second L-shaped groove, the first L-shaped groove and the second L-shaped groove are symmetrically arranged with respect to a central line of the telescopic rod 10, so that when a first clamping head 311 on the third limiting sheet 31 and a second clamping head 321 on the fourth limiting sheet 32 approach each other, a third limiting protruding portion 312 extends into the third limiting groove 82, and a fourth limiting protruding portion 322 extends into the fourth limiting groove 84. In this case, a ferrule 41 is sleeved on an outer wall of the telescopic rod 10 of the second telescopic assembly, the first clamping head 311 and the second clamping head 321 extend into a sixth limiting groove 42 in the ferrule 41, and the sixth limiting groove 42 fits with the first clamping head 311 and the second clamping head 321, so that the first clamping head 311 and the second clamping head 321 are confined in the sixth limiting groove 42 and cannot move relative to each other, and finally a wrench 46 is pulled to drive the two open ends of the ferrule 41 to approach each other, so as to tightly hold the telescopic rod 10 of the second telescopic assembly. Of course, a seventh limiting groove is provided in the ferrule 41, and a fifth limiting protruding portion is arranged on the outer wall of the telescopic rod 10 of the second telescopic assembly, and is configured to limit movement of the ferrule 41 along the telescopic rod 10 of the second telescopic assembly in a direction facing away from the first clamping head 311 and the second clamping head 321. When the first clamping head 311 and the second clamping head 321 are separated from the sixth limiting groove 42, the first clamping head 311 on the third limiting sheet 31 and the second clamping head 321 on the fourth limiting sheet 32 can move away from each other, so that the third limiting protruding portion 312 is separated from the third limiting groove 82, the fourth limiting protruding portion 322 is separated from the fourth limiting groove 84, and thus the third limiting sheet 31 and the fourth limiting sheet 32 can be taken out from the telescopic rod 10 without causing any obstruction to the first limiting device 20. That is, the telescopic rod 10 can be separated from top to bottom or from bottom to top. In addition, the telescopic rod 10 of each section can be detached independently, thereby greatly improving use flexibility of the support foot and facilitating maintenance.

The first limiting device 20 includes the first limiting sheet 21 and the second limiting sheet 22 that are arranged on an outer side of the telescopic rod 10, a first limiting protruding portion 211 is arranged on an inner side wall of the first limiting sheet 21, a second limiting protruding portion is arranged on an inner side wall of the second limiting sheet 22, two sides of the telescopic rod 10 are provided with a first limiting groove 212 and a second limiting groove 221 respectively, the first limiting protruding portion 211 is inserted in the first limiting groove 212, and the second limiting protruding portion is inserted in the second limiting groove 221. The first limiting sheet 21 and the second limiting sheet 22 provide a limiting function, and also provide an anti-slip function, which can increase friction between two adjacent sections of telescopic rods 10.

The second limiting device 30 includes the third limiting sheet 31 and the fourth limiting sheet 32 that are arranged on an inner side of the telescopic rod 10, where the first clamping head 311 and the third limiting protruding portion 312 are arranged on the third limiting sheet 31, the second clamping head 321 and the fourth limiting protruding portion 322 are arranged on the fourth limiting sheet 32, one side of the second end of the telescopic rod 10 is provided with the first through groove 81 and the third limiting groove 82 communicating with the first through groove 81, the other side of the second end of the telescopic rod 10 is provided with the second through groove 83 and the fourth limiting groove 84 communicating with the second through groove 83, and the locking device 40 can be connected to the first clamping head 311 and the second clamping head 321 when the third limiting protruding portion 312 extends into the third limiting groove 82 through the first through groove 81 and the fourth limiting protruding portion 322 extends into the fourth limiting groove 84 through the second through groove 83, so as to limit separation of the next-section telescopic rod 10 from the telescopic rod 10.

An end face of the second end of the telescopic rod 10 is provided with a fifth limiting groove 50, and the first clamping head 311 and the second clamping head 321 are movably arranged in the fifth limiting groove 50. A width of the fifth limiting groove 50 along a circumferential direction of the telescopic rod 10 is greater than the sum of widths of the first clamping head 311 and the second clamping head 321, so that the first clamping head 311 and the second clamping head 321 can move away from each other or approach each other in the fifth limiting groove 50, and rotation angles of the first clamping head 311 and the second clamping head 321 can be limited to avoid an excessive rotation angle.

The locking device 40 includes:

the ferrule 41 sleeved at the second end of the telescopic rod 10 and provided with the sixth limiting groove 42;

a first connecting rod 43 connected to two open ends of the ferrule 41;

a spring 44 sleeved on the first connecting rod 43 and abutting against the two open ends of the ferrule 41;

a second connecting rod 45 connected to an end of the first connecting rod 43 by means of a detachable structure 60; and the wrench 46 rotatably connected to the second connecting rod 45, where the wrench 46 has a locking position and an unlocking position, and the first clamping head 311 and the second clamping head 321 can extend into the sixth limiting groove 42 when the wrench 46 is at the locking position, or can be separated from the sixth limiting groove 42 when the wrench 46 is at the unlocking position.

The detachable structure 60 is a threaded connection structure.

An anti-slip gasket 70 is arranged between the wrench 46 and the ferrule 41. Friction between the wrench 46 and the ferrule 41 is increased through the arrangement of the anti-slip gasket 70.

A support frame includes the support foot.

Certainly, the present disclosure is not limited to the above implementation. Equivalent transformations and replacements may be made by those skilled in the art without departing from the spirit of the present disclosure, and shall fall within the scope defined by the claims of the present application.

What is claimed is:

1. A telescopic support foot, comprising a plurality of telescopic assemblies, wherein the telescopic assemblies each comprise:

a first telescopic rod (10) with a first end inserted into a second end of a second telescopic rod disposed outside of the second telescopic rod (10), wherein a telescopic rod disposed inside of the telescopic rod (10) is inserted into a second end of the telescopic rod (10);

a first limiting device (20) connected to the first end of the first telescopic rod (10);

a second limiting device (30) connected to the second end of the second telescopic rod (10), wherein the first limiting device (20) on the first telescopic rod disposed inside of the second telescopic rod (10) abuts against the second limiting device (30) of the second telescopic rod (10) to limit separation of the first telescopic rod disposed inside of the second telescopic rod (10) from the telescopic rod (10); and a locking device (40) arranged at the second end of the second telescopic rod (10), connected to the second limiting device (30), and configured to lock or unlock the second limiting device (30), wherein the second limiting device (30) is separated from the second end of the second telescopic rod (10) when the locking device (40) is in an unlocked state, to enable the first telescopic rod disposed inside of the second telescopic rod (10) to be separated from the telescopic rod (10);

wherein the second limiting device (30) comprises a third limiting sheet (31) and a fourth limiting sheet (32) that are arranged on an inner side of the second telescopic rod (10), a first clamping head (311) and a third limiting protruding portion (312) are arranged on the third limiting sheet (31), a second clamping head (321) and a fourth limiting protruding portion (322) are arranged on the fourth limiting sheet (32), one side of the second end of the second telescopic rod (10) is provided with a first through groove (81) and a third limiting groove (82) communicating with the first through groove (81), the other side of the second end of the second telescopic rod (10) is provided with a second through groove (83) and a fourth limiting groove (84) communicating with the second through groove (83), and the locking device (40) is connected to the first clamping head (311) and the second clamping head (321) when the third limiting protruding portion (312) extends into the third limiting groove (82) through the first through groove (81) and the fourth limiting protruding portion (322) extends into the fourth limiting groove (84) through the second through groove (83), so as to limit separation of the first-telescopic rod disposed inside of the second telescopic rod (10) from the telescopic rod (10).

2. The telescopic support foot according to claim 1, wherein the first limiting device (20) comprises a first limiting sheet (21) and a second limiting sheet (22) that are arranged on an outer side of the telescopic rod (10), a first limiting protruding portion (211) is arranged on an inner side wall of the first limiting sheet (21), a second limiting protruding portion is arranged on an inner side wall of the second limiting sheet (22), two sides of the telescopic rod (10) are provided with a first limiting groove (212) and a second limiting groove (221) respectively, the first limiting protruding portion (211) is inserted in the first limiting groove (212), and the second limiting protruding portion is inserted in the second limiting groove (221).

3. A support frame, comprising the telescopic support foot of claim 2.

4. The telescopic support foot according to claim 1, wherein an end face of the second end of the telescopic rod (10) is provided with a fifth limiting groove (50), and the first clamping head (311) and the second clamping head (321) are movably arranged in the fifth limiting groove (50).

5. A support frame, comprising the telescopic support foot of claim 4.

6. The telescopic support foot according to claim 1, wherein the locking device (40) comprises:

a ferrule (41) sleeved at the second end of the telescopic rod (10) and provided with a sixth limiting groove (42);

a first connecting rod (43) connected to two open ends of the ferrule (41);

a spring (44) sleeved on the first connecting rod (43) and abutting against the two open ends of the ferrule (41);

a second connecting rod (45) connected to an end of the first connecting rod (43) by means of a detachable structure (60), and a wrench (46) rotatably connected to the second connecting rod (45), wherein the wrench (46) has a locking position and an unlocking position, and the first clamping head (311) and the second clamping head (321) extend into the sixth limiting groove (42) when the wrench (46) is at the locking position, or are separated from the sixth limiting groove (42) when the wrench (46) is at the unlocking position.

7. The telescopic support foot according to claim 6, wherein the detachable structure (60) is a threaded connection structure.

8. A support frame, comprising the telescopic support foot of claim 7.

9. The telescopic support foot according to claim 6, wherein an anti-slip gasket (70) is arranged between the wrench (46) and the ferrule (41).

10. A support frame, comprising the telescopic support foot of claim 9.

11. A support frame, comprising the telescopic support foot of claim 6.

12. A support frame, comprising the telescopic support foot of claim 1.

* * * * *